United States Patent
Tomida et al.

(10) Patent No.: US 8,915,351 B2
(45) Date of Patent: Dec. 23, 2014

(54) WORK PIECE CONVEYING APPARATUS AND WORK PIECE MANUFACTURING METHOD

(71) Applicant: Asmo Co., Ltd., Kosai, Shizuoka-pref. (JP)

(72) Inventors: Yoshimasa Tomida, Hamamatsu (JP); Akihiro Shirai, Toyohashi (JP)

(73) Assignee: Asmo Co., Ltd., Shizuoka (JP)

( * ) Notice: Subject to any disclaimer, the term of this patent is extended or adjusted under 35 U.S.C. 154(b) by 53 days.

(21) Appl. No.: 13/932,012

(22) Filed: Jul. 1, 2013

(65) Prior Publication Data

US 2014/0008181 A1    Jan. 9, 2014

(30) Foreign Application Priority Data

Jul. 4, 2012    (JP) .................................. 2012-150909

(51) Int. Cl.
*B65G 19/00*    (2006.01)
*B65G 17/00*    (2006.01)
*B65G 19/02*    (2006.01)

(52) U.S. Cl.
CPC .............. *B65G 17/005* (2013.01); *B65G 19/02* (2013.01)
USPC .......................... 198/728; 198/736; 198/750.1

(58) Field of Classification Search
USPC .......................... 198/728, 736, 750.1; 271/527
See application file for complete search history.

(56) References Cited

FOREIGN PATENT DOCUMENTS

JP    2002-186224 A    6/2002
JP    2005-153123 A    6/2005

*Primary Examiner* — Douglas Hess
(74) *Attorney, Agent, or Firm* — Solaris Intellectual Property Group, PLLC (57) ABSTRACT

A work piece conveying apparatus capable of conveying plural work pieces with differing transport pitches to each other. The work piece conveying apparatus includes a drive motor that includes an output shaft, plural drive pulleys that are fixed to the output shaft and have different diameters to each other, plural timing belts that are respectively entrained around the plural drive pulleys, and plural coupling plates that are respectively fixed to the timing belts and that move reciprocating with different transport pitches to each other accompanying forward and reverse rotation of the output shaft, and cause to convey work pieces.

7 Claims, 5 Drawing Sheets

WORK PIECE CONVEYING APPARATUS AND WORK PIECE MANUFACTURING METHOD

CROSS-REFERENCE TO RELATED APPLICATION

This application claims priority under 35 USC 119 from Japanese Patent Application No. 2012-150909, filed Jul. 4, 2012 the disclosure of which is incorporated by reference herein.

BACKGROUND OF THE INVENTION

1. Field of the Invention

The present invention relates to a work piece conveying apparatus and to a work piece manufacturing method.

2. Related Art

Work piece conveying apparatuses are known that are provided with plural movement members that move reciprocating with equal transport pitches and convey work pieces (see for example Japanese Patent Application Laid-Open (JP-A) No. 2005-153123 and JP-A No. 2002-186224.

In such types of work piece conveying apparatuses, sometimes there is a need for plural work pieces to be conveyed with different transport pitches to each other.

SUMMARY OF THE INVENTION

The present invention is accordingly to provide a work piece conveying apparatus capable of conveying plural work pieces with different transport pitches to each other.

Further, the present invention is to provide a work piece manufacturing method capable of raising productivity.

A work piece conveying apparatus of a first aspect includes: a drive motor that includes an output shaft; a plurality of rotation members that are fixed to the output shaft and that have different diameters from each other; a plurality of transmission members that are respectively entrained around the plurality of rotation members; and a plurality of movement members that are respectively fixed to the plurality of transmission members, that move reciprocating with different transport pitches from each other accompanying forward rotation and reverse rotation of the output shaft, and that cause respective work pieces to be conveyed.

According to this work piece conveying apparatus, the plural rotation members are fixed to the output shaft and have different diameters to each other, and thus the plural movement members move reciprocating with different transport pitches to each other accompanying forward rotation and reverse rotation of the output shaft. Consequently, the plural work pieces can be conveyed with different transport pitches to each other by such movement of the plural movement members.

A work piece conveying apparatus of a second aspect is the work piece conveying apparatus of the first aspect, wherein: the plurality of transmission members are disposed side-by-side to each other; and the plurality of movement members are disposed so as to be lined up along a length direction of the plurality of transmission members.

According to this work piece conveying apparatus, the plural movement members are disposed along the length direction of the plural transmission members, thereby enabling the plural work pieces to be respectively conveyed with different transport pitches to each other along the length direction of the plural transmission member.

A work piece conveying apparatus of a third aspect is the work piece conveying apparatus of the second aspect, further including: a plurality of conveying members that are disposed so as to be lined up along the length direction of the plurality of transmission members, that are movable along the length direction of the plurality of transmission members, and that convey the respective work pieces; a coupling mechanism that switches between being in a coupled state coupling the plurality of conveying members to the respective plurality of movement members, and being in an uncoupled state (a couple released state) not coupling the plurality of conveying members to the respective plurality of movement members; an actuator that performs switching of the coupling mechanism; and a control circuit that controls the drive motor and the actuator such that respective work pieces are conveyed to a plurality of conveyance positions in sequence by the plurality of conveying members being moved with the different transport pitches from each other.

According to this work piece conveying apparatus, the plural conveying members are moved with different transport pitches to each other by the drive motor and the actuator being controlled by the control circuit. Thus the work pieces can be conveyed in sequence from an initial position to plural convey positions (at plural positions set at different pitches from each other).

A work piece conveying apparatus of a fourth aspect is the work piece conveying apparatus of the third aspect further including a holding mechanism that holds the respective plurality of conveying members when the coupling mechanism is in the uncoupled state.

According to this work piece conveying apparatus, the plural conveying members can be respectively held by the holding mechanism when the coupling mechanism is in the uncoupled state. The plural conveying members can thus be suppressed from moving unintentionally.

A work piece conveying apparatus of a fifth aspect is the work piece conveying apparatus of the third aspect or the fourth aspect, wherein each of the plurality of movement members is provided so as to straddle the plurality of transmission members, and the plurality of movement members are respectively fixed to the plurality of transmission members via a fixing member.

According to this work piece conveying apparatus, the plural movement members are provided so as to respectively straddle the plural transmission members, and hence the structure can be simplified since there is no need to make placement or configuration of the plural movement members different from each other. Moreover, in order to respectively fix the plural movement members to the plural transmission members, the plural movement members provided as described above so as to straddle the plural transmission members are selectively fixed to the plural transmission members using respective fixing members. Consequently, the plural movement members can be easily fixed to the respective plural transmission members.

Moreover, a work piece manufacturing method of a sixth aspect includes: causing a plurality of work pieces to be respectively conveyed in sequence by a plurality of movement members while moving the plurality of movement members reciprocally with different transport pitches from each other, by forward rotating and reverse rotating an output shaft of a drive motor so as to forward rotate and reverse rotate a plurality of transmission members, the plurality of rotation members having different diameters from each other and being fixed to the output shaft of the drive motor, the plurality of transmission members being respectively entrained around the plurality of rotation members, and the plurality of movement members being respectively fixed to the plurality of transmission members; and performing at least one of processing or assembly on each of the plurality of work pieces caused to be conveyed by the plurality of movement members.

According to this work piece manufacturing method, due to being able to convey the work pieces to the next process by an appropriate movement amount corresponding to the process at each of convey positions, an idle state, in which work pieces on any one or more of the pallets partway through being conveyed are not having processing or assembly performed thereon, can be suppressed. As a result processing and assembly can be performed efficiently to the work pieces, thereby enabling productivity to be raised.

BRIEF DESCRIPTION OF THE DRAWINGS

Embodiments of the invention will be described in detail with reference to the following figures, wherein.

DETAILED DESCRIPTION OF THE INVENTION

Explanation follows regarding an exemplary embodiment of the present invention, with reference to the drawings.

Figure 1:
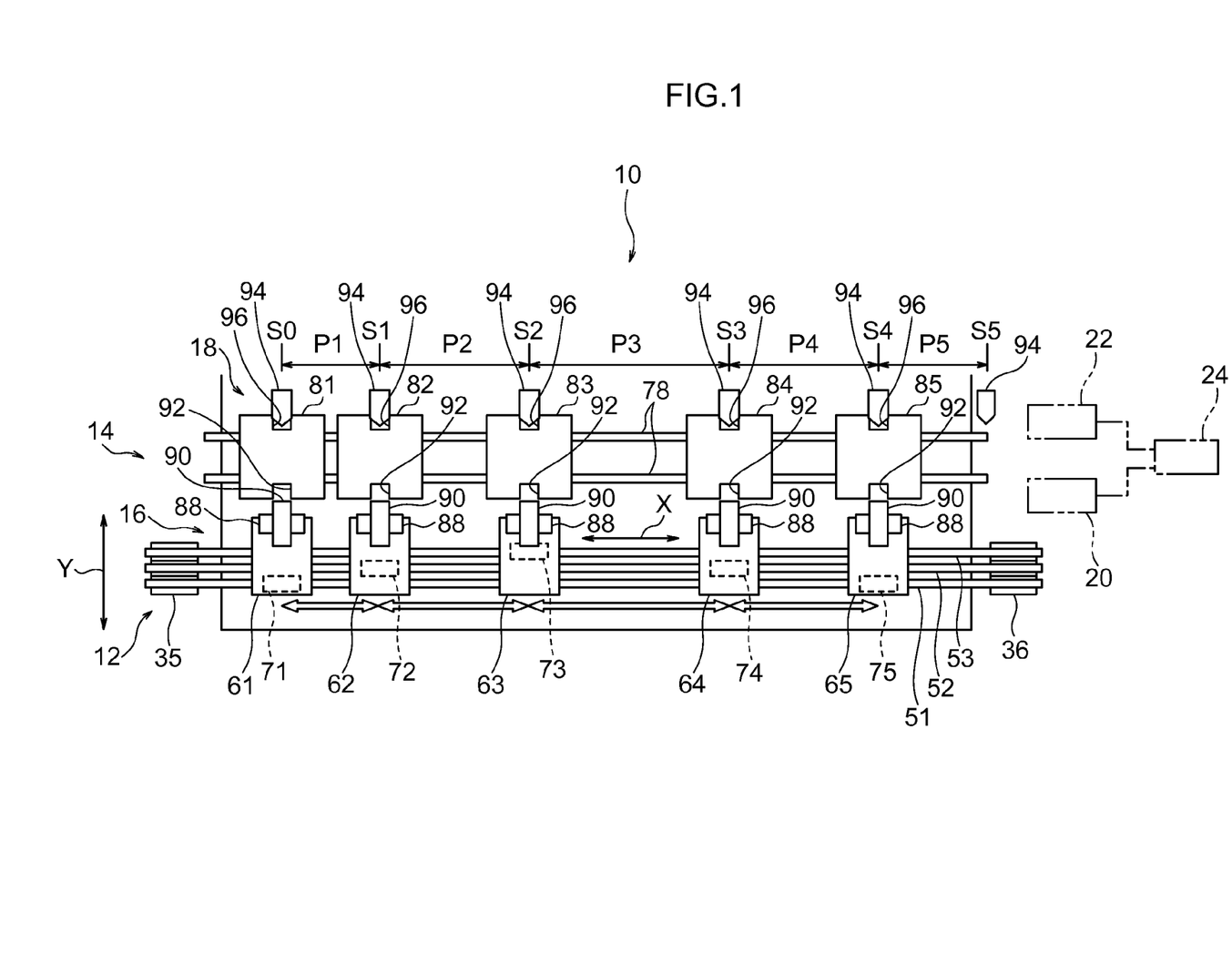
FIG. 1 is a plan view of a work piece conveying apparatus according to an exemplary embodiment of the present invention.

As illustrated in FIG. 1, a work piece conveying apparatus 10 according to an exemplary embodiment includes a drive mechanism 12, a conveying mechanism 14, a coupling mechanism 16, a holding mechanism 18, a pair of actuators 20 and 22, and a control circuit 24.

Figure 2:
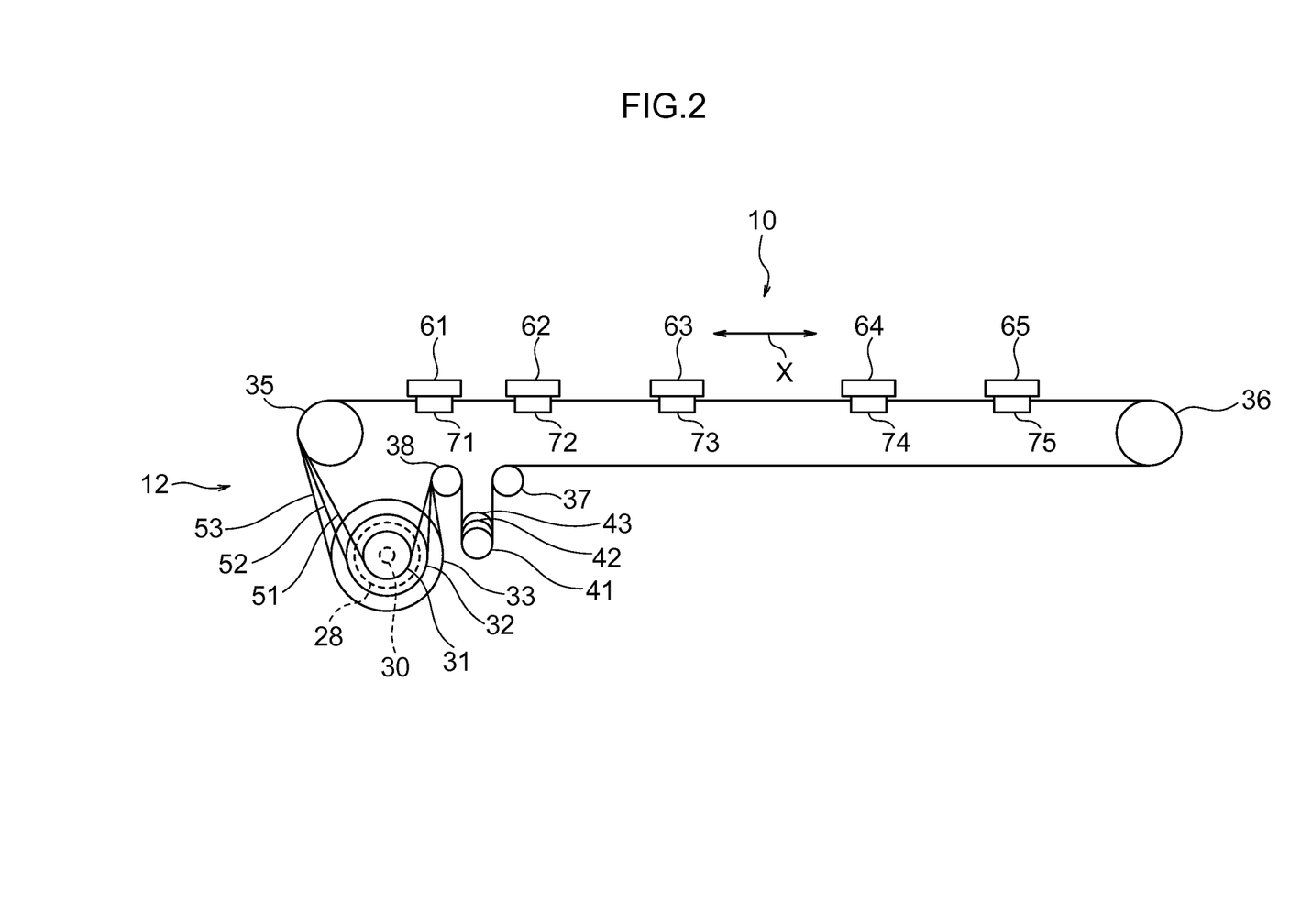
FIG. 2 is a front side view of the work piece conveying apparatus illustrated in FIG. 1.

The drive mechanism 12 includes, as illustrated in FIG. 2, a drive motor 28, plural drive pulleys 31 to 33, plural following pulleys (driven pulleys) 35 to 38, plural tension pulleys 41 to 43, plural timing belts 51 to 53, and plural coupling plates 61 to 65.

The drive motor 28 includes an output shaft 30. The plural drive pulleys 31 to 33 serve as examples of plural rotation members. The plural drive pulleys 31 to 33 are disposed coaxially to each other and fixed to the output shaft 30. The plural drive pulleys 31 to 33 are configured with different diameters to each other. Namely, the first drive pulley 31 has a diameter that is smaller than that of the second drive pulley 32, and the second drive pulley 32 has a diameter that is smaller than that of the third drive pulley 33 (see FIG. 3).

The plural timing belts 51 to 53 serve as examples of plural transmission members, and are each respectively formed in a ring shape. The plural timing belts 51 to 53 are entrained respectively around the plural drive pulleys 31 to 33 (the timing belt 51 is entrained around the drive pulley 31, the timing belt 52 is entrained around the drive pulley 32, the timing belt 53 is entrained around the drive pulley 33), and each of the plural timing belts 51 to 53 is entrained around the plural following pulleys 35 to 38. The plural timing belts 51 to 53 are disposed side-by-side (parallel) to each other, as illustrated in FIG. 1 (disposed so as to be arranged along a direction orthogonal to the length direction of the timing belts 51 to 53 in plan view).

The plural coupling plates 61 to 65 serve as examples of plural movement members, and are disposed so as to be arranged (lined up) along the length direction of the plural timing belts 51 to 53 (an arrow X direction). The plural coupling plates 61 to 65 are respectively fixed to the plural timing belts 51 to 53.

More specifically, the first coupling plate 61 is fixed to the first timing belt 51 through a belt clamp 71, and the second coupling plate 62 is fixed to the second timing belt 52 through a belt clamp 72. The third coupling plate 63 is fixed to the third timing belt 53 through a belt clamp 73, and a fourth coupling plate 64 is fixed to the second timing belt 52 through a belt clamp 74. A fifth coupling plate 65 is fixed to the first timing belt 51 through a belt clamp 75. The belt clamps 71 to 75 each serve as an example of a fixing member.

Figure 3:
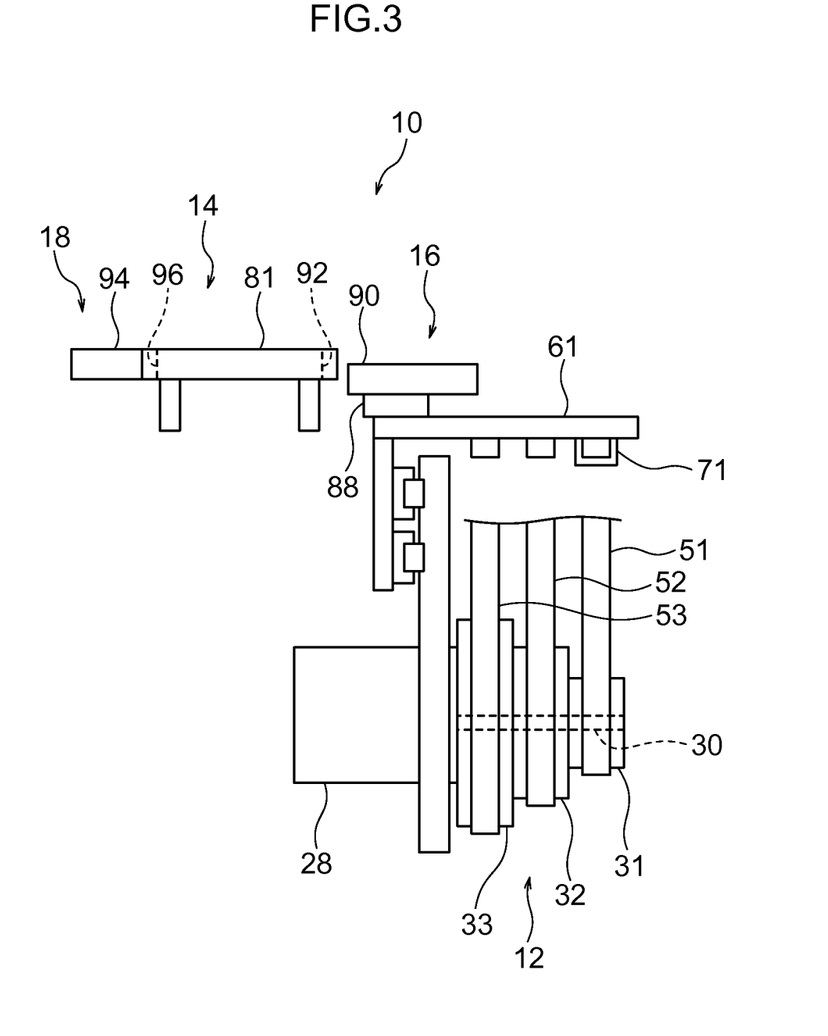
FIG. 3 is a lateral side view of the work piece conveying apparatus illustrated in FIG. 1.

Moreover, the plural coupling plates 61 to 65, as described in detail later, move reciprocating (back and forth) with different transport (feed) pitches to each other accompanying forward/reverse rotation of the output shaft 30 (see FIG. 2 and FIG. 3). Namely, the first coupling plate 61 moves reciprocating between an initial position S0 and a first convey position S1, defined by a first pitch P1, and the second coupling plate 62 moves reciprocating between the first convey position S1 and a second convey position S2, defined by a second pitch P2.

Moreover, the third coupling plate 63 moves reciprocating between the second convey position S2 and a third convey position S3, defined by a third pitch P3, and the fourth coupling plate 64 moves reciprocating between the third convey position S3 and a fourth convey position S4, defined by a fourth pitch P4. Moreover, the fifth coupling plate 65 moves reciprocating between the fourth convey position S4 and a fifth convey position S5, defined by a fifth pitch P5.

Note that in the present exemplary embodiment, as an example, the transport pitch P1 and the transport pitch P5 are set the same as each other, and the transport pitch P2 and the transport pitch P4 are set the same as each other.

The plural coupling plates 61 to 65 are configured substantially the same as each other, and are provided so as to straddle the plural timing belts 51 to 53. Namely, each of the coupling plates 61 to 65 extends in the side-by-side arranged direction (the arrow Y direction) of the plural timing belts 51 to 53, and as illustrated in FIG. 1, in plan view of the drive mechanism 12, each of the coupling plates 61 to 65 intersects with the plural timing belts 51 to 53.

The conveying mechanism 14 is configured including a pair of guide members 78 and plural pallets 81 to 85. The pair of guide members 78 are each configured as a rail, and are disposed so as to be parallel to each other. The pair of guide members 78 are provided so as to be arranged alongside the plural timing belts 51 to 53 in the side-by-side arranged direction (the arrow Y direction) of the plural timing belts 51 to 53.

The plural pallets 81 to 85 serve as examples of plural conveying members. The plural pallets 81 to 85 are for conveying work pieces, and are disposed so as to be arranged (lined up) along the length direction (the arrow X direction) of the plural timing belts 51 to 53. The plural pallets 81 to 85 are movably attached to the pair of guide members 78, thereby the plural pallets 81 to 85 are movable along the length direction of the plural timing belts 51 to 53.

The plural pallets 81 to 85 are respectively provided alongside the plural coupling plates 61 to 65 in the side-by-side arranged direction of the plural timing belts 51 to 53 (the arrow Y direction). Note that the pair of guide members 78 are formed in ring shapes, and the plural pallets 81 to 85 are moved in one direction along the pair of guide members 78.

The coupling mechanism 16 includes plural grippers 88. The plural grippers 88 are respectively provided to the plural coupling plates 61 to 65, and each includes an engagement protrusion 90 that projects out towards the side of the plural pallets 81 to 85. The plural grippers 88 are displaceable in the side-by-side arranged direction (the arrow Y direction) of the plural timing belts 51 to 53.

Then, when the plural grippers 88 are moved to the plural pallet 81 to 85 side, an engagement indentation (a concave portion) 92 formed in each of the plural pallets 81 to 85 is engaged by the respective plural engagement protrusions 90. The plural pallets 81 to 85 are placed in a coupled state to the respective plural coupling plates 61 to 65 when the plural engagement protrusions 90 have engaged with the respective plural engagement indentations 92.

The engaged state of the plural engagement protrusions 90 and the plural engagement indentations 92 is released when the plural grippers 88 are moved to the opposite side to the plural pallets 81 to 85. Moreover, the plural pallets 81 to 85 are placed in an uncoupled state (a couple released state) from the plural coupling plates 61 to 65 when the engaged state of the plural engagement protrusions 90 and the plural engagement indentations 92 has been released.

The holding mechanism 18 includes plural lock members 94. These plural lock members 94 are disposed at respective positions corresponding to move positions of the respective coupling plates 61 to 65 described above (an initial position S0, and a first convey position S1 to a fifth convey position S5). The plural lock members 94 are formed with projected protruding shapes, and respectively disposed at the side of the plural pallets 81 to 85 opposite to the side of the grippers 88 such that the pallets 81 to 85 are between the lock members 94 and the grippers 88. The plural lock members 94 are displaceable such that the plural lock members 94 can become a state (for example, engage-released state) opposite to a state of the grippers 88 described above (for example, engaged state).

The plural lock members 94 respectively engage with a groove 96 formed in each of the plural pallets 81 to 85 when the plural lock members 94 are moved to the side of the plural pallets 81 to 85. The plural lock members 94 hold each of the plural pallets 81 to 85 in their respective positions when the plural lock members 94 have engaged with the plural grooves 96.

The engaged state of the plural lock members 94 and the plural grooves 96 is released when the plural lock members 94 are moved to the opposite side to the plural pallets 81 to 85. Moreover, the plural pallets 81 to 85 are in a movable state in the length direction of the plural timing belts 51 to 53 when the engaged state of the plural lock members 94 and the plural grooves 96 has been released.

Note that drive of the plural grippers 88 described above (switching in the coupling mechanism 16) is performed by the actuator 20, and drive of the plural lock members 94 described above (switching in the holding mechanism 18) is performed by the actuator 22.

The control circuit 24 controls the drive motor 28 (see FIG. 2 and FIG. 3) and the actuators 20 and 22 described above based on an applied operation signal. Explanation regarding operation of the control circuit 24 is given below together with explanation of the operation of the work piece conveying apparatus 10.

Explanation follows regarding operation of the work piece conveying apparatus 10, and regarding a work piece manufacturing method using the work piece conveying apparatus 10.

Figure 4:
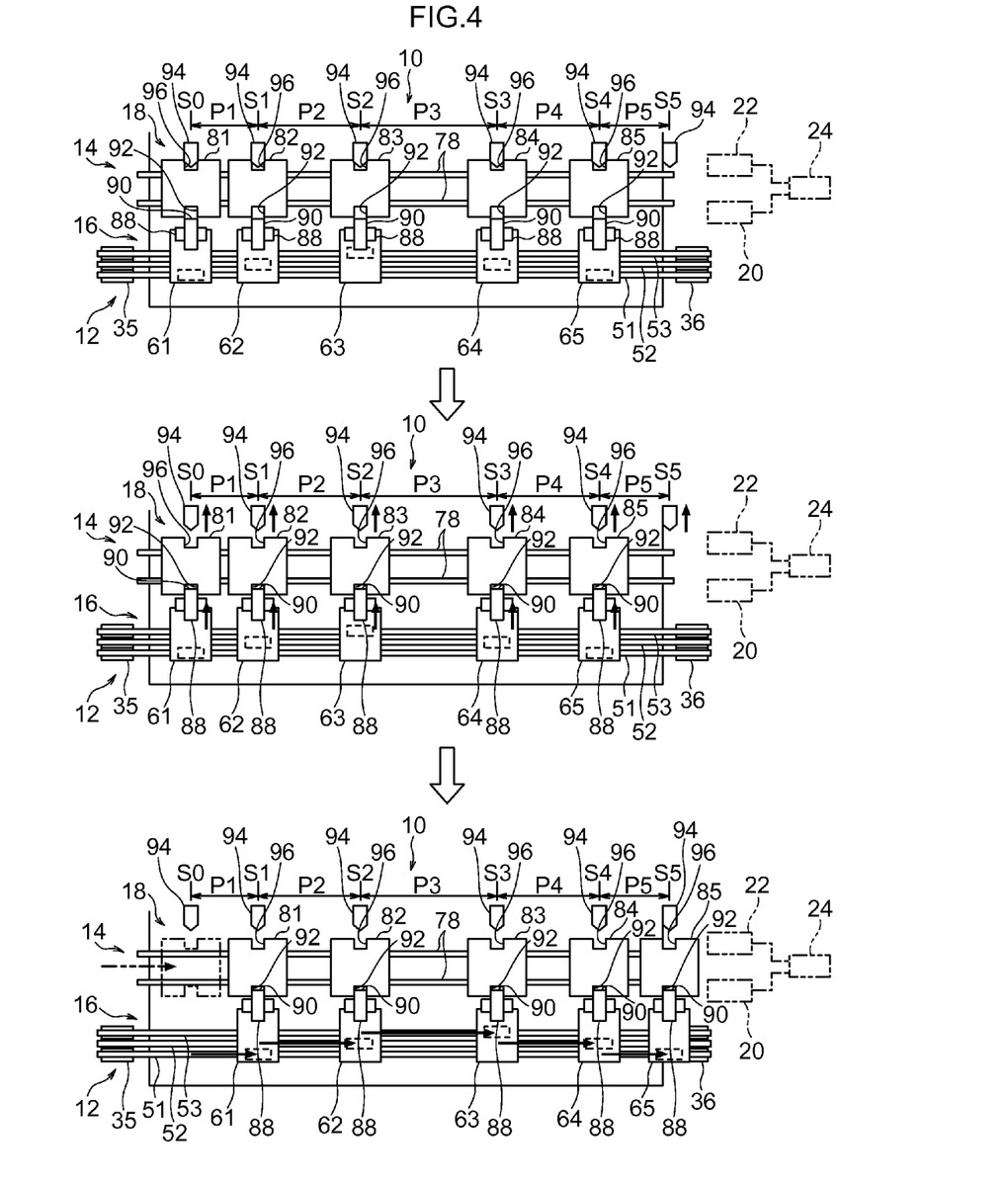
FIG. 4 is a first explanatory diagram for explaining operation of the work piece conveying apparatus illustrated in FIG. 1.

First, as illustrated at the top of FIG. 4, the first coupling plate 61 and the first pallet 81 are positioned at the initial position S0, and the second to the fifth coupling plates 62 to 65 and the second to the fifth plates 82 to 85 are respectively positioned at the first to the fourth convey positions S1 to S4.

A work piece is held respectively on each of the first to the fifth pallets 81 to 85. The plural lock members 94 are moved toward one side of the plural pallet 81 to 85, and are engaged with the respective plural grooves 96. The plural lock members 94 hold each of the plural pallets 81 to 85 in their respective positions by the plural lock members 94 engaging with the plural grooves 96.

The engaged state of the plural engagement protrusions 90 and the plural engagement indentations 92 is released when the plural grippers 88 are moved to the side opposite to the other side of the plural pallets 81 to 85. The plural pallets 81 to 85 are placed in the uncoupled state (the couple released state) from the plural coupling plates 61 to 65 by release of the engaged state of the plural engagement protrusions 90 and the plural engagement indentations 92.

Then, when the actuator 22 is driven by the control circuit 24 in this state, as illustrated in the center of FIG. 4, the plural lock members 94 are moved to the side opposite to the one side of the plural pallets 81 to 85, and the engaged state between the plural lock members 94 and the plural grooves 96 is released.

Moreover, when the actuator 20 is driven by the control circuit 24, the plural grippers 88 are moved to the other side of the plural pallets 81 to 85, such that the plural engagement protrusions 90 respectively engage with the plural engagement indentations 92. The plural pallets 81 to 85 are placed in the coupled state to the respective plural coupling plates 61 to 65 by the plural engagement protrusions 90 engaging with the plural engagement indentations 92.

Next, the drive motor 28 (see FIG. 2 and FIG. 3) is driven by the control circuit 24 such that the output shaft 30 rotates in a forward direction, rotating the plural timing belts 51 to 53 in the forward direction. Then, as illustrated at the bottom of FIG. 4, the first coupling plate 61 and the pallet 81 are moved from the initial position S0 to the first convey position S1, and the second coupling plate 62 and the pallet 82 are moved from the first convey position S1 to the second convey position S2.

The third coupling plate 63 and the pallet 83 are moved from the second convey position S2 to the third convey position S3, and the fourth coupling plate 64 and the pallet 84 are moved from the third convey position S3 to the fourth convey position S4. Moreover, the fifth coupling plate 65 and the pallet 85 are moved from the fourth convey position S4 to the fifth convey position S5. The work pieces held by the first to the fifth pallets 81 to 85 are thereby respectively conveyed to the next convey positions.

Figure 5:
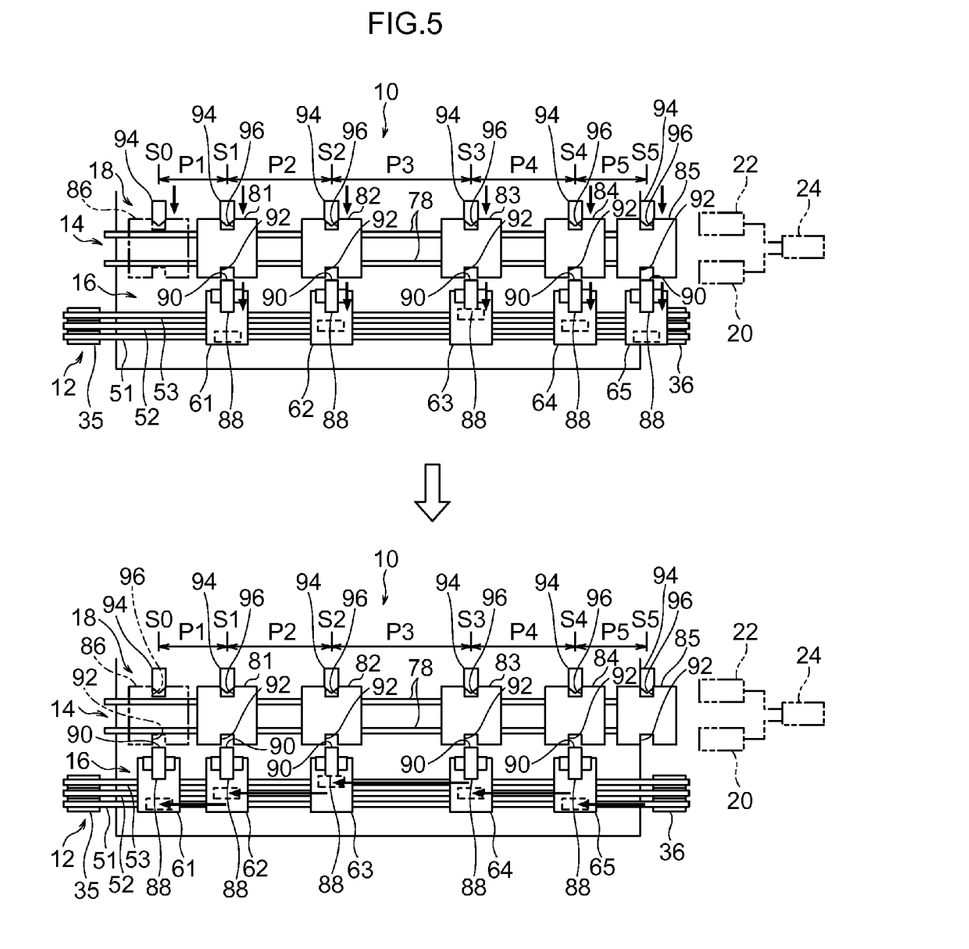
FIG. 5 is a second explanatory diagram for explaining operation of the work piece conveying apparatus illustrated in FIG. 1.

Next, the actuator 22 is actuated by the control circuit 24. Then, as illustrated at the top of FIG. 5, the plural lock members 94 are moved to the one side of the plural pallets 81 to 85, and the plural lock members 94 are respectively engaged with the plural grooves 96. The plural pallets 81 to 85 are thus held in their respective positions by the plural lock members 94 engaging with the plural grooves 96.

The plural grippers 88 are moved to the side opposite to the other side the pallets 81 to 85 by the actuator 20 being driven by the control circuit 24, releasing the engaged state of the plural engagement protrusions 90 and the plural engagement indentations 92. The plural pallets 81 to 85 are placed in the uncoupled state from the plural coupling plates 61 to 65 when the engaged state between the plural engagement protrusions 90 and the plural engagement indentations 92 is released.

Next, the drive motor 28 is driven by the control circuit 24 such that the output shaft 30 is rotated in a reverse direction, thereby rotating the plural timing belts 51 to 53 in the reverse direction. Then, as illustrated at the bottom of FIG. 5, the first coupling plate 61 is returned from the first convey position S1 to the initial position S0, and the second coupling plate 62 is returned from the second convey position S2 to the first convey position S1.

Moreover, the third coupling plate 63 is returned from the third convey position S3 to the second convey position S2, and the fourth coupling plate 64 is returned from the fourth convey position S4 to the third convey position S3. The fifth coupling plate 65 is returned from the fifth convey position S5 to the fourth convey position S4. Note that a pallet 86 holding thereon a new work piece is conveyed to the initial position S0.

Then, by repeatedly performing the operations described above, work pieces are conveyed in sequence from the initial position S0 to the plural convey positions S1 to S5 by the plural pallets 81 to 85 that move with different transport pitches to each other.

Note that in the present exemplary embodiment, the work pieces are, for example, circuit boards. In a case in which the work pieces are circuit boards, processes and assembly operations such as circuit element mounting and soldering are performed to the plural circuit boards as work pieces at the respective first convey position S1 to the fifth convey position S5.

Explanation next follows regarding operation and advantageous effects of the exemplary embodiment of the present invention.

As described in detail above, according to the work piece conveying apparatus 10 of the exemplary embodiment of the present invention, the plural drive pulleys 31 to 33 fixed to the output shaft 30 have different diameters to each other. The plural coupling plates 61 to 65 accordingly move reciprocating with different transport pitches to each other accompanying forward rotation and reverse rotation of the output shaft 30. Consequently, plural work pieces can each be conveyed with different transport pitches to each other along the length direction of the plural timing belts 51 to 53 by the movement of the plural coupling plates 61 to 65.

Namely, each of the plural pallets 81 to 85 moves with different transport pitches to each other accompanying movement of the plural coupling plates 61 to 65, and the work pieces can thereby be conveyed in sequence from the initial position S0 to the plural convey positions S1 to S5 (plural positions set at different pitches to each other).

The work pieces can accordingly be conveyed to the next processes with the appropriate movement amounts corresponding to the processes at each of the convey positions. Thus an idle state, in which work pieces on any one or more of the pallets partway through being conveyed are not having processing or assembly performed thereon, can be suppressed. As a result processing and assembly can be performed efficiently to the work pieces, thereby enabling productivity to be raised.

Moreover, each of the plural pallets 81 to 85 can be held by the holding mechanism 18 when the coupling mechanism 16 is in the uncoupled state (the couple released state). Unintentional movement of the plural pallets 81 to 85 can accordingly be suppressed.

Moreover, each of the plural coupling plates 61 to 65 is provided so as to straddle (so as to be astride) the plural timing belts 51 to 53, and hence the structure can be simplified since there is no need to make the placement and configuration of the plural coupling plates 61 to 65 different from each other.

Configuration is made for example such that the plural coupling plates 61 to 65 that are provided so as to straddle the plural timing belts 51 to 53 as described above are selectively fixed to each of the plural timing belts 51 to 53 via belt grippers 71 to 75 in order to fix the plural coupling plates 61 to 65 to each of the respective timing belts 51 to 53. Consequently, the plural coupling plates 61 to 65 can be easily respectively fixed to the plural timing belts 51 to 53.

Explanation next follows regarding modified examples of the first exemplary embodiment of the present invention.

In the above exemplary embodiment, the work piece conveying apparatus 10 is, for example, equipped with the drive mechanism 12 that includes the drive pulleys 31 to 33 and the plural timing belts 51 to 53. A drive mechanism with plural sprockets and plural chains may be used as the drive mechanism 12. In such a case, plural sprockets of different diameter to each other serve as the plural rotation members, and the plural chains entrained around respectively the plural sprockets serve as the transmission members.

Moreover, although the work piece conveying apparatus 10 described above is equipped with the 5 coupling plates 61 to 65, another number of coupling plates may be employed.

In the above exemplary embodiment, the transport pitch P1 and the transport pitch P5 are set the same as each other, and the transport pitch P2 and the transport pitch P4 are set the same as each other, however other combinations may be set for the transport pitches. Namely, each of the transport pitches is settable as desired.

Moreover, although the circuit boards have been given as an example of work pieces, other work pieces, such as for example armatures, may be employed. In a case in which the work pieces are armatures, processing and assembly may be performed to components such as commutators or shafts for each of the plural armature work pieces at each of the respective first convey position S1 to the fifth conveyance position S5. Moreover, the work piece conveying apparatus 10 and the work piece manufacturing method using this of the present exemplary embodiment are applicable to processing and/or assembling of various other configuration-components of rotating electrical machines such as motor components, for example, processing of commutators, processing of shafts, and also assembling of armatures, assembling-in of armatures to yokes.

The work piece conveying apparatus 10, and the work piece manufacturing method using the work piece conveying apparatus 10 may also be applied to any work pieces. Moreover, either only processing or only assembly may be performed to the work pieces.

Moreover, the driving of the plural grippers 88 described above (switching in the coupling mechanism 16) is performed by the actuator 20 and the driving of the plural lock members 94 described above (switching in the holding mechanism 18) is performed by the actuator 22, however driving of the grippers 88 and driving of the lock members 94 may be performed by a single common actuator via a link mechanism. The structure can be simplified thereby, and the manufacturing cost can be reduced.

Although explanation has been given above regarding the exemplary embodiment of the present invention, the present invention is not limited thereto, and obviously various modifications other than those described above may be implemented within a range not departing from the scope of the present invention.

What is claimed is:

1. A work piece conveying apparatus comprising:
a drive motor that includes an output shaft;
a plurality of rotation members that are fixed to the output shaft and that have different diameters from each other;
a plurality of transmission members that are respectively entrained around the plurality of rotation members; and
a plurality of movement members that are respectively fixed to the plurality of transmission members, that move reciprocating with different transport pitches from each other accompanying forward rotation and reverse rotation of the output shaft, and that cause respective work pieces to be conveyed.

2. The work piece conveying apparatus of claim 1, wherein:
the plurality of transmission members are disposed side-by-side to each other; and
the plurality of movement members are disposed so as to be lined up along a length direction of the plurality of transmission members.

3. The work piece conveying apparatus of claim 2, further comprising:
a plurality of conveying members that are disposed so as to be lined up along the length direction of the plurality of transmission members, that are movable along the length direction of the plurality of transmission members, and that convey the respective work pieces;
a coupling mechanism that switches between being in a coupled state coupling the plurality of conveying members to the respective plurality of movement members, and being in an uncoupled state not coupling the plurality of conveying members to the respective plurality of movement members;
an actuator that performs switching of the coupling mechanism; and
a control circuit that controls the drive motor and the actuator such that respective work pieces are conveyed to a plurality of conveyance positions by the plurality of conveying members being moved with the different transport pitches from each other.

4. The work piece conveying apparatus of claim 3, further comprising a holding mechanism that holds the respective plurality of conveying members when the coupling mechanism is in the uncoupled state.

5. The work piece conveying apparatus of claim 4, wherein each of the plurality of movement members is provided so as to straddle the plurality of transmission members, and the plurality of movement members are respectively fixed to the plurality of transmission members via a fixing member.

6. The work piece conveying apparatus of claim 3, wherein each of the plurality of movement members is provided so as to straddle the plurality of transmission members, and the plurality of movement members are respectively fixed to the plurality of transmission members via a fixing member.

7. A work piece manufacturing method comprising:
causing a plurality of work pieces to be respectively conveyed by a plurality of movement members while moving the plurality of movement members reciprocally with different transport pitches from each other, by forward rotating and reverse rotating an output shaft of a drive motor so as to forward rotate and reverse rotate a plurality of transmission members,
the plurality of rotation members having different diameters from each other and being fixed to the output shaft of the drive motor,
the plurality of transmission members being respectively entrained around the plurality of rotation members, and
the plurality of movement members being respectively fixed to the plurality of transmission members; and
performing at least one of processing or assembly on each of the plurality of work pieces caused to be conveyed by the plurality of movement members.

* * * * *